United States Patent [19] [11] 3,727,220
Brennan et al. [45] Apr. 10, 1973

[54] ADAPTIVE RECEIVING ARRAY METHOD AND APPARATUS FOR MTI RADAR

[75] Inventors: Lawrence E. Brennan, Tarzana; Irving S. Reed, Santa Monica, both of Calif.

[73] Assignee: Technology Service Corporation, Santa Monica, Calif.

[22] Filed: Sept. 13, 1971

[21] Appl. No.: 179,777

[52] U.S. Cl. ................................... 343/7 A, 343/7.7
[51] Int. Cl. ................................................ G01s 9/42
[58] Field of Search ............................. 343/7 A, 7.7

[56] References Cited

UNITED STATES PATENTS 3,417,396  12/1968  Stifter et al. ........................... 343/7.7
3,587,097  6/1971  Stull ....................................... 343/7 A

*Primary Examiner*—T. H. Tubbesing
*Attorney*—Lindenberg, Freilich & Wasserman

[57] ABSTRACT

Adaptive doppler signal processing is disclosed in coherent pulsed radars with phased array antennas. Outputs from each range ring are obtained for each of K consecutive pulses and from each of N receiving array elements. These KN outputs are multiplied by complex weights and added to obtain the system output. The complex weights are controlled adaptively. To improve the convergence rate of an adaptive 2-pulse moving-target-indicating system, the pulse outputs $V_1$ and $V_2$ from each of the N elements are first passed through a transformation matrix.

18 Claims, 7 Drawing Figures

ADAPTIVE RECEIVING ARRAY METHOD AND APPARATUS FOR MTI RADAR

BACKGROUND OF THE INVENTION

This invention relates to a method and apparatus for adaptive receiving array antennas for moving-target-indicator (MTI) systems, such as an airborne radar or sonar.

It would be desirable to apply array doppler processing to MTI systems, i.e., to provide an MTI system that is adaptive in both space and time. This has been discovered to provide excellent MTI performance in coherent airborne radar systems with array antennas.

In a phased array antenna, the signals received by the array elements can be added directly at RF to form a receiving beam or can be amplified individually and then added coherently at RF or IF. The latter method is used in adaptive arrays, with the phase and amplitude of each element output controlled by an adaptive circuit.

In a linear array antenna, the received signals of successive individual elements 1 to N may be denoted by $v_1, v_2, v_3, \ldots, v_N$. The receiving beam is formed by multiplying each signal $v_n$ by a complex weight $w_n$, and summing these weighted element output signals. The array output E is given by $$E = \sum_{n=1}^{N} w_n v_n \tag{1}$$

Both the $v_n$ and $w_n$ are complex quantities, i.e., are variable in both phase and amplitude.

For simplicity, only linear arrays are being considered because the theory of planar arrays is closely analogous to linear array theory. Adaptive array theory and techniques can also be applied to nonplanar arrays of elements, e.g., a conformal array flush mounted on an aircraft, by proper phase compensation.

The gain of a linear array antenna is a function of $\theta$, the angle of incidence with the array. When a sinusoidal signal of wavelength $\lambda$ is incident on an array of equally spaced elements from the angle $\theta$, the output signal (voltage or current) E is given by $$E(\theta) = K \sum_{n=1}^{N} w_n e^{\frac{-2\pi i n d}{\lambda} \sin \theta} \tag{2}$$

where
$d$ = spacing between elements
$K$ = constant

The individual sinusoidal signals in the element channels ($v_1, v_2, \ldots, v_N$) are phase and amplitude weighted by the set of complex values $\{w_n\}$ and added coherently. The vector representation of Eqs. (1) and (2) is a standard method of computing the sum of sinusoids of variable phase and amplitude. The magnitude of E represents the amplitude of the resulting sum sine wave and the angle (argument) of E represents the output phase. When the weights $w_n$ are the same for all elements, a beam is formed normal to the array and $$E(\theta) = K \frac{\sin\left(\frac{\pi N d}{\lambda} \sin \theta\right)}{\sin\left(\frac{\pi d}{\lambda} \sin \theta\right)} \tag{3}$$

This is the well known sin $x/x$ pattern for a uniformly weighted array and can be computed directly from Eq. (2). From these equations it may be seen that the beam of a linear array can be scanned electronically by introducing the appropriate phase gradient along the array. This is accomplished by simply selecting the phases of the weights $w_n$ such that a signal incident from the desired scan angle adds in phase.

Antenna sidelobe levels can be reduced by tapering the amplitude of the array illumination function. This is also accomplished by adjustment of the complex weights $w_n$. The Dolph-Chebychev theory, expounded in an article titled "Current Distribution For Broadside Arrays Which Optimizes The Relationship Between Beamwidth and Sidelobe Level", and published in Proc. IRE, June 1946 at pages 335 to 348, can be used to compute optimum sets of element weights for a linear array antenna. The optimization criterion is minimum beamwidth for a given peak sidelobe level or, conversely, minimum peak sidelobe level for a given width of the main beam. In theory, the sidelobes in a linear array antenna can be reduced to any desired level.

In practice, the sidelobe level in array antennas is usually higher than the design level and is determined by factors other than the specified amplitude taper of the illumination function. Factors which often limit practical sidelobe levels are:

a. Excitation errors in the array; the actual weights $w_n$ are different than the specified weights due to these errors.

b. Reflection and refraction of electromagnetic energy by a radome.

c. Reflections from objects in the antenna near field, e.g., aircraft structure near an airborne antenna.

One important advantage of adaptive array antennas is their ability to sense and compensate for each of these three effects.

The second important advantage of adaptive arrays is related to the external noise field. In many radar systems, performance (detection range and target parameter estimation accuracy) is limited by the external noise field rather than by radar receiver noise. In some cases, discrete interference sources such as jammers limit the system sensitivity. In other cases, radar clutter (backscattering from land or sea) limits system performance. An adaptive array can be configured to sense the external noise field and drive the element weights $w_n$ to optimum values. An adaptive system will automatically place a null in the antenna pattern at the angle of a discrete jammer. When clutter is nonuniformly distributed in angle, an adaptive array can be configured to sense the clutter distribution and reduce the sidelobes most in the directions of the largest clutter returns.

In an adaptive array, the receiving beam is formed by adding the complex-weighted outputs of the array elements. Each of the element weights $w_n$ is controlled by a separate adaptive loop. The set of weights $\{w_n\}$ can vary with time and is a function of both the external noise field and the control loop parameters.

Adaptive arrays which minimize the mean square error between a desired signal and the array output have been described in a series of reports by B. Widrow and associates of Stanford University published in Proc.

IEEE, December 1967, Vol. 55, No. 12 at pages 2143-2159 and October 1969, Vol. 57, No. 10 at pages 1696-1704, and in a Stanford University Report SU-SEL-66-126, December 1966. An adaptive array technique for maximizing the output signal-to-noise ratio (S/N) has been described by S. Applebaum in a Syracuse University Research Corporation report No. SPL 769, June 30, 1964. In both cases, the array output is obtained as a complex-weighted sum of the array elements outputs. The details of the control loops are different in the two cases. The maximum S/N adaptive array is of greater interest in radar applications.

Two adaptive signal processing techniques for coherent airborne radars are applicable to radar systems employing phased array receiving antennas. The first is adaptive in the spatial domain only — the illumination function of a phased array receiving antenna is controlled adaptively to reduce the antenna sidelobe levels. The second technique is adaptive in both space and time — both the receiving array illumination function and the MTI filter parameters are controlled adaptively, with the additional capability of varying the illumination function from pulse to pulse. The first technique which is in the prior art is effective only in reducing clutter and other interference received through the antenna sidelobes, while the second technique which is the object of the present invention rejects both main beam and sidelobe clutter, and provides excellent MTI gain in coherent airborne radars. There is, however, a convergence rate problem for some combination of antenna scan angle and platform velocity. Thus, while the adaptive space-time system of the present invention always approaches an optimum solution which provides excellent MTI gain, the convergence rate is too slow in some cases to accommodate the antenna scan rates of interest. Accordingly, another object of the present invention is to improve convergence rate.

SUMMARY OF THE INVENTION

Briefly, the present invention is embodied in a coherent pulsed airborne radar system wherein a separate coherent output is available from each element of a receiving phased array antenna. A set of $K$ consecutive returns from successive range rings is obtained from each of $N$ array elements. In these $NK$ coherent returns or samples, both amplitude and phase information is retained. In accordance with one feature of the present invention, the $NK$ samples are multiplied by adaptively controlled complex weights and added to obtain the output for the corresponding range resolution cell. To accomplish that, each of the NK signals is coupled to a summing means by an adaptive loop. All loops are identical except for differences in steering signals. A 2-pulse MTI system with the radar line-of-sight normal to the platform velocity is formed adaptively with the steering signals $S_{n1}^* = 1$, $S_{n2}^* = -1$. At other scan angles, the $S_{nk}^*$ are matched to a target moving $\lambda/4$ radially between pulses. The output of the summing means is given by $$V_\Sigma = \sum_{n=1}^{N} \sum_{k=1}^{K} W_{nk} V_{nk} \quad (4)$$

where $W_{nk}$ is the weight applied to the $n^{th}$ element for the $k^{th}$ pulse of the train, and $V_{nk}$ is the corresponding sample of the received voltage. The steady state weights are given by $$W = (M + I/G)^{-1} S^* \quad (5)$$

where $W$ denotes a column vector of the weights $W_{kn}$, $M$ is the clutter covariance matrix, $I$ the identity matrix, $G$ the loop gain, and $S^*$ the steering vectors.

The weight for a given element $n$ is produced by converting the element output signal $v_n$ into its complex conjugate according to the equation $V_n^* = R(t)\sin[w_o t - \phi(t)]$, where $V_n = R(t)\sin[w_o t + \phi(t)]$, $R(t)$ is the signal amplitude (envelope), $\sin \omega_o(t)$ is the carrier and $\phi(t)$ is the phase modulation of the carrier. The complex conjugate $v_n^*$ is multiplied by $V_\Sigma$ to obtain a signal $z_n$ which is low-pass filtered and subtracted from $S_n^*$ to obtain the weight signal $w_n$. By amplitude limiting the complex conjugate $v_n^*$ such that $R(t) = 1$, dynamic range effects are reduced in the adaptive system.

Adaptive processing in the time domain alone is achieved when $N=1$, and the signals $V_k$ corresponding to pulses from one range ring are received via a conventional radar antenna, to continuously optimize filter response and system performance in a varying clutter environment.

To improve the convergence rate of a 2-pulse MTI system, i.e., of a system in which $K=2$, the two pulse outputs $V_{n1}$ and $V_{n2}$ from the nth antenna array element are transformed as follows:

$$X_n = U_n V_n \quad (6)$$

$$U_n = \frac{1}{\sqrt{2}} \begin{pmatrix} -e^{i\psi} 1 \\ e^{i\psi} 1 \end{pmatrix} \quad (7)$$

$$X_n = \begin{pmatrix} X_{n1} \\ X_{n2} \end{pmatrix} V_n = \begin{pmatrix} V_{n1} \\ V_{n2} \end{pmatrix} \quad (8)$$

The transformed pulses $X_{n1}$ and $X_{n2}$ are then summed according to Eq. (4) through adaptive control loops as the pulse outputs $V_{n1}$ and $V_2$ were before. Alternatively, or additionally, convergence may be improved by varying the radar pulse repetition frequency (PRF), and altering the pulse delay elements of the MTI system correspondingly, to maintain interpulse motion of the antenna platform at an integral number of half element spacings. To further improve the convergence of a 2-pulse canceller, the outputs $V_{n1}$ and $V_{n2}$ are transformed to approximately normal coordinates by selecting $\psi$ to be equal to $(4\pi D/\lambda) \cos \theta$ where D is the distance the platform moves between pulses, $\lambda$ is wavelength and $\theta$ is the approximate angle of the antenna main beam axis to the velocity vector of antenna motion. Then a larger gain factor (GFAC) is employed for producing the signals $X_{n1}$ than for producing the signals $X_{n2}$. Alternatively, a larger amplifier gain (G) may be employed in the adaptive control loops for the signals $X_{n1}$ than for the signals $X_{n2}$, where the increase of the gain G is to a value equal to the square of the gain factor GFAC found to be optimum.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
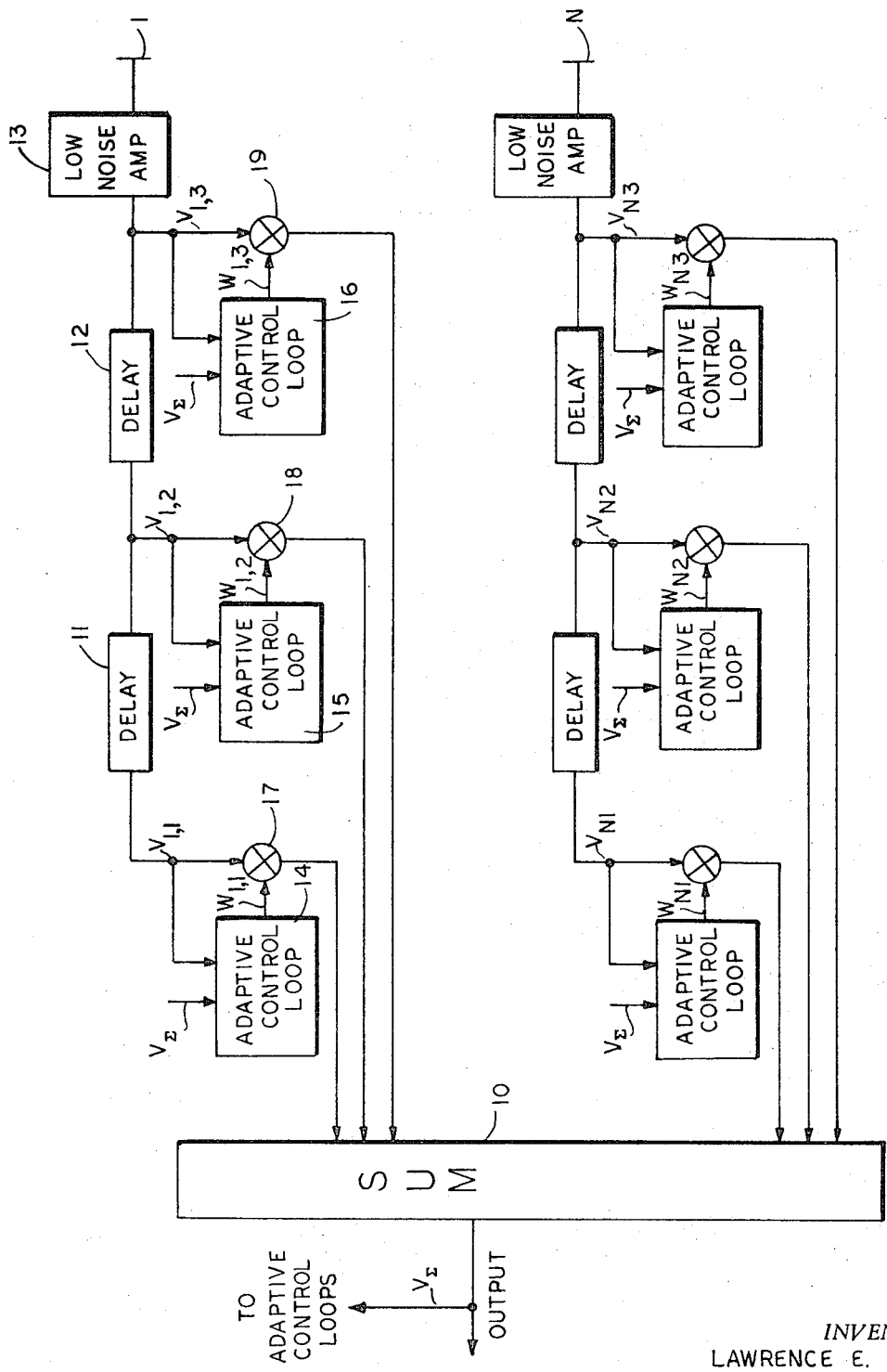
FIG. 1 is a block diagram of an adaptive doppler signal processing system for airborne MTI array radar according to the present invention.

Referring now to FIG. 1, an adaptive signal processing system in a coherent pulsed radar with a phased array antenna is shown. For simplicity, only a linear array of antenna elements 1 to $N$ disposed in a horizontal direction is to be considered, but it is to be understood that the technique to be described may be applied in a planar array in which case the outputs of elements in each column are combined, such as is done in a slotted antenna array, and the outputs of the columns are treated as the outputs of elements in a linear array. The reason for this is that adaptive doppler signal processing is required in only the direction of motion of the radar platform. Thus, in an array of slots or dipole elements, any known technique for combining the outputs of elements in each column may be used, and each column is then treated as an element. Accordingly, the term "element" as employed hereinafter is used to refer to either discrete antenna elements in a linear array or a column of combined elements in a planar array, even though the specific example illustrated is, for simplicity, only linear arrays. It should be further understood that the adaptive control loops can also be applied to nonplanar arrays of elements, e.g., a conformal array flush mounted on an aircraft.

In general, the transmitted waveform from elements 1 to $N$ (controlled by a transmitting system not shown) is a coherent pulse train. The return waveform from each of the $N$ receiving array elements contains outputs from each range ring for each of $K$ consecutive pulses. These $KN$ outputs from a range ring are multiplied by complex weights $W_{nk}$ and added to obtain an adaptive array/doppler processor (ADP) output for the corresponding range ring.

In an analog system, the ADP shown in FIG. 1 would receive a continuous waveform from each element, amplify it and process it to provide the ADP output as a continuous waveform from summing means 10. That ADP output waveform would then be applied as a continuous intensity control signal in the cathode-ray-tube display (not shown). Since each processing channel between an element and the summing means is the same (except for values of weights $W_{nk}$ applied through adaptive control loops), only the organization of one channel need be described. For a 3-pulse (double-delay) MTI system, where $K$ is equal to 3, two delay elements 11 and 12 are connected in series to a low noise amplifier 13 in order to provide from element 1 three amplified signals $V_{1,1}$ to $V_{1,3}$ separated in time. Each delay is equal to the radar pulse repetition period, and is shown schematically to be variable in order that the delay be made equal to the pulse repetition period when that repetition period is selected, normally at the time of design for a particular installation or application. The signals are then multiplied by the respective weights $W_{1,1}$ to $W_{1,3}$ developed by adaptive control loops 14 to 16. The multiplication is carried out through balanced mixers 17 to 19.

In a digital system, the low noise amplifier would be followed by a sample and hold circuit synchronized by range pulses and an analog-to-digital converter for both amplitude and phase information. The delay elements 11 and 12 would then be digital unit delay operators, such as memory locations or registers, and the adaptive control loops 14 to 16 and multipliers 17 to 19 would each be implemented with digital techniques using either hardware (discrete components) or software (programmed digital computer). A hybrid system for implementing this ADP concept using some analog and some digital processing would also be possible. However, in each case the implementation would be in accordance with the basic concept best illustrated by the analog system of FIG. 1.

This ADP is clearly more general than either an adaptive array antenna or an adaptive filter. Each of the $NK$ signals is multiplied by a different complex constant $W_{nk}$. In effect, the receiving array illumination function changes from pulse to pulse. This is a very important advantage in airborne MTI radars, where the performance limitation is due primarily to main beam clutter spectral spreading caused by platform motion. With the antenna pointed normal to the radar velocity vector, the illumination function of the array is displaced backward on successive pulses to compensate for the forward aircraft motion.

Before proceeding further with a description of the system of FIG. 1, the adaptive control loops will be described with reference to FIG. 2. Since only the values of the steering signals applied vary from one loop to another, only one loop for the $k^{th}$ pulse of the $n^{th}$ element will represent all loops.

The analysis of this ADP concept is closely analogous to that of the adaptive array presented hereinbefore. It should be noted that the quantities are doubly subscripted in FIG. 1. The weight applied to the $n^{th}$ element for the $k^{th}$ pulse of the train is $W_{nk}$ and the corresponding sample of the received voltage is $V_{nk}$. It is convenient for descriptive purposes to convert these two-dimensional (space-time) arrays to single subscripted variables as follows:

$$V_{nk} \equiv v_{n+(k-1)N} \tag{9}$$

$$W_{nk} \equiv w_{n+(k-1)N} \tag{10}$$

The following analysis will be performed in terms of these singly-subscripted variables.

The overall function of the adaptive control loop is to control the complex weight $W_{nk}$. The array output is the complex weighted sum given by Eq. (4). From Eq. (5) it can be seen that each weight is a function of the steering vector $S_n^*$.

To better understand the role of the steering signals, assume an array of $N$ elements in an adaptive array antenna without array doppler processing, i.e., a prior art antenna which is adaptive in only space, and not both space and time. To form a beam normal to a linear array, the steering signals $S_n^*$ are identical in all element channels. To scan the beam electronically, a phase gradient is introduced in the complex steering signals. For example, the set of steering signals $$s_n^* = c e^{i\left[\frac{2\pi nd}{\lambda} \sin\theta_1 + \alpha\right]}$$

where $c$ and $\alpha$ are arbitrary constants and the asterisk denotes a conjugate, scans the received beam to the angle $\theta_1$.

Lacking a good heuristic explanation of the operation of such an N-loop adaptive array, an analysis to prove that the control loops drive the set of complex weights $\{w_n\}$ to optimum values will be relied upon. First, a few observations may provide some insight into the functioning of an adaptive array. Note that with the single-subscript notation, Eqs. (9) and (10) $u_{kn}$ becomes $u_n$ in FIG. 2 and $z_{nk}$, which becomes $z_n$, is the cross-correlation between $V_{kn}$, which becomes $V_n$, and the array output $V_\Sigma$, which is then $\Sigma w_n v_n$. A multiplier 21 and low pass filter 22 form the cross-correlator.

To complete the control loop, a summing amplifier 23 adds the steering signal $S_n^*$ to the correlator output $u_n$ to form the element weight $w_n$. A multiplier 24, which corresponds to one of the multipliers of the system already referred to, such as the multiplier 19 for the first element and third pulse, produces the product $w_n v_n$. A complex conjugate converter 25, receives the signal $v_n$ in a complex form $x+iy$, and converts it to the conjugate form $x-iy$. If the signal $v_n$ is in digital form, the complex conjugate is formed by simply inverting the sign of the imaginary term $iy$. In a control loop implemented with analog techniques, the incoming signal $v_n$ on a carrier of frequency $f$, and a local oscillator signal of frequency $f_2$ are applied to a mixer to produce signals of both the sum $(f_1+f_2)$ and difference $(f_1-f_2)$. The difference will have the phase reversal necessary for the complex conjugate. This analog technique for implementing the complex conjugate converter is commonly used in radar sidelobe cancellers.

Continuing with an analysis of the $n^{th}$ control loop assumed to be in a system adaptive in space only, consider that in channels where the correlation between $v_n$ and the output $v$ is large, $u_n$ and $w_n$ change more rapidly than in channels with low correlation. The adaptive array is attempting to drive the output noise in the output to a low value. In channels with a large correlation, a change in the element weight $w_n$ will have a greater effect in reducing the noise residue in the output. In the absence of steering signals, all element weights could be driven to zero. In effect, the receiving array could reach a stable state wherein the system was turned off. Therefore, the steering signals are important in a receiving array even while not electronically scanning.

A third observation relates to the case of receiver noise only. Before the beam is formed adaptively, the input signal in each channel is amplified. This amplification can be performed at IF, provided a common local oscillator signal is used in all channels to preserve the channel-to-channel coherence of the $N$ signals. When only receiver noise is present and the receiver noise power is the same in all $N$ channels, the weights approach the same value in all channels. If one of the element weights $w_n$ is larger, the corresponding term in the output $\Sigma w_n v_n$ is larger and results in a larger cross-correlation or average value of $z_n$. This increase $u_n$ in that channel and decreases $w_n$. When all $w_n$ are the same and at equilibrium values, the $N$ values of $u_n$ are equal and the system remains in equilibrium. For this case of receiver noise only, the uniform array illumination (all element weights equal) achieved by the adaptive array is optimum.

In the following analysis, assume that the desired signal energy received by the array is very small compared to the interference plus noise energy. This is a good assumption in most radar applications. For example, in a typical pulsed search radar, a target echo, if present, lasts only a small fraction of an interpulse period. In this case, the adaptive control loops are attempting to minimize the output power, subject to the steering vector constraint which preserves the main beam response. When the output noise is $\Sigma w_n v_n$ is near zero, the multiplier output $z_n$ is small and the weight tends to remain constant.

Figure 2:
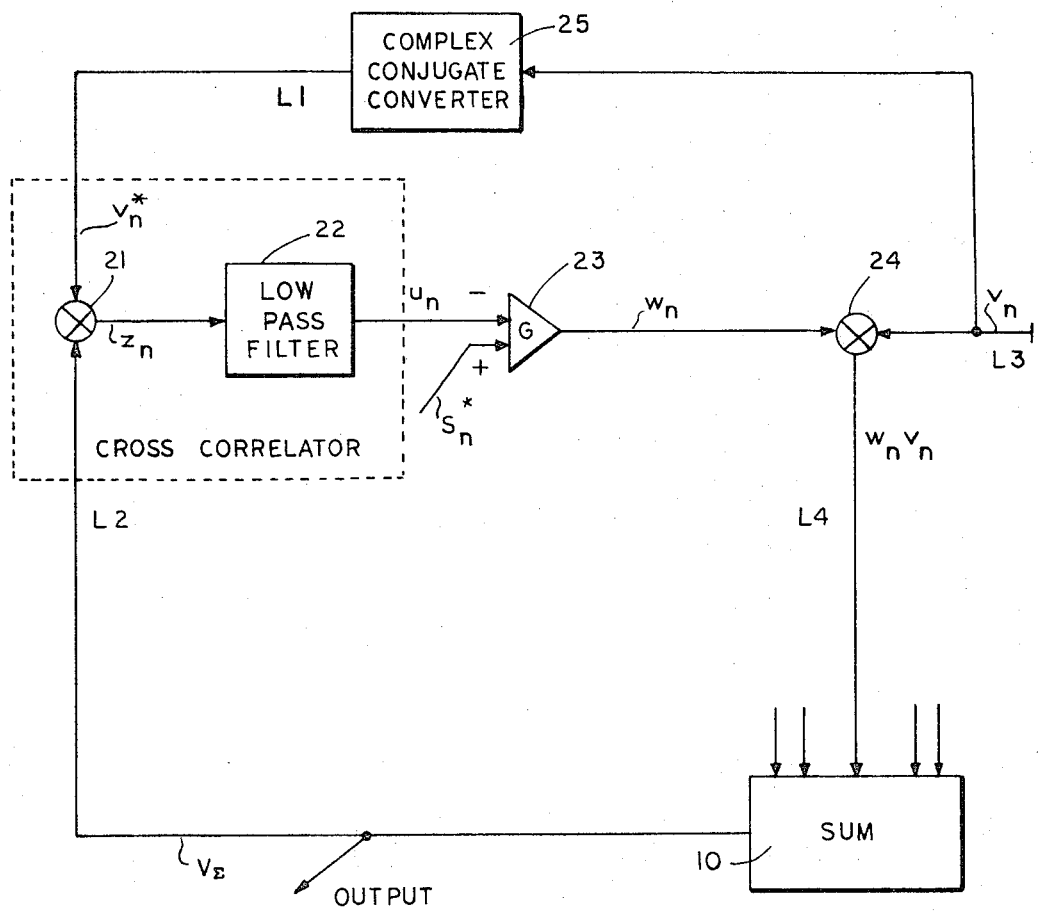
FIG. 2 is a block diagram of an adaptive control loop for the system of FIG. 1.

The complex weight for the $n^{th}$ control loop shown in FIG. 2 is related to the correlator output $u_n$ by $$w_n = G(s_n^= u_n) \tag{11}$$

where
$G$ = amplifier gain in control loop
$s_n^=$ = complex steering signal in the $n^{th}$ loop
The low pass filter with time constant $\tau$ is described by $$\tau \dot{u}_n + u_n = z_n \tag{12}$$

Higher order filters can be used in adaptive control loops, and are discussed elsewhere by L. Brennan, I. Reed and E. Pugh in IEEE Trans. AES. March 1971 at pages 254 to 262. The multiplier output $z_n$ is given by $$z_n = v_n^* \sum_{n=1}^{N} w_n v_n \tag{13}$$

This equation describes the response of each of the $N$ control loops in an array adaptive in space only.

The element weights of a system of $N$ equations according to Equation (13) are interrelated, i.e., the variation of a given element weight $w_n$ depends on the inputs to all $N$ channels and also on the weights in the other $N$-1 channels. It is convenient to express these interrelated equations in matrix form, with each quantity represented by a column vector of $N$ complex variables. For example, $$W = \begin{pmatrix} w_1 \\ w_2 \\ w_3 \\ \cdot \\ \cdot \\ \cdot \\ w_N \end{pmatrix}$$

The quantities S, U, V and Z represent column vectors of the corresponding subscripted complex variables. In this notation, Equations (11), (12) and (13) are $$W = G(S^* - U) \tag{11a}$$

$$\tau \dot{U} + U = Z \tag{12a}$$

$$Z = V^*(V_T W) \tag{13a}$$

Equations (11a) and (12a) are simply a convenient method of expressing N equations of the form of Equations (11) and (12). In Equation (13a), $$V_T W = \sum_{n=1}^{N} w_n v_n \tag{14}$$

is the product of a row vector $V_T$ and a column vector $W$.

In an adaptive array, the bandwidth of the control loops is generally small compared to the bandwidth of the input noise process $V$. The average values of the quantities in Equations 11a and 12a satisfy the same Equations (11a) and (12a), while in terms of average values, Equation (13a) becomes $$Z = \overline{V^* V_T} W = MW \tag{15}$$

The covariance matrix, M, of the input noise process is an $N \times N$ matrix with elements $$M_{ij} = Ave[v_i^* v_j] \tag{16}$$

Equation (15) follows from the independence of $W$ and the instantaneous value of $V$, due to the face that the $w_n$ change much more slowly than the $v_n$.

In Equation (13a), $S^*$ is a constant, so $$\dot{U} = -\dot{W}/G \tag{17}$$

Substituting Equations (15) and (17) into Equations (12a), and replacing $U$ by its value from Equation (11a) gives $$(T/G) \dot{W} + [(M + (I/G))] W = S^* \tag{18}$$

where $I$ is the identity matrix. Equation (18) is a system of $N$ interrelated differential equations describing the average response of the adaptive array weights $W$. It should be noted that the array weights depend on the external noise field represented by the noise-covariance matrix $M$ as well as the loop parameters $S^*$, $G$, and $\tau$.

The steady-state solution which the array weights approach is obtained by setting $\dot{W}$ equal to zero in Equation (18).

$$[M + (I/G)] \dot{W} = S^* \tag{19}$$

When the loop gain is large so that $I/G$ can be neglected in comparison with M, the weights approach the steady-state values $$W = M^{-1} S^* \tag{20}$$

This is the optimum set of complex weights, i.e., the weights which maximize the ratio of main beam gain to total noise power in the output. Proof of the optimality of Equation (20) is given by L. A. Wainstein and V.D. Zubakov in *Extraction of Signals From Noise*, Prentice Hall, Inc., 1962, at pate 130.

The preceeding analysis provides a direct method of computing the steady-state performance of an adaptive array. When the loop time constant is large, the input noise field is smoothed over a long time interval and the weights approach the values of Equation (20). The resulting antenna patterns can be computed directly from the steady-state weights of Equation (20. In many radar problems, the external noise field is varying and the adaptive loop convergence rate is important.

The convergence rate of an adaptive array to optimum weights and the noisiness of the control loops are a function of the external noise field, as well as of the loop parameters ($G$ and $\tau$).

In the computation of transient response of an adaptive array, quantities of the form $G\mu_n$ occur explicitly in the equations for array transient response and loop noise, where $\mu_n$ are eigenvalues which are a function of the incident noise field at the array and $G$ is the loop gain. Also the steady-state solution toward which an adaptive array converges contains a bias error (the $I/G$ term in Equations (19) and (20)) unless $G\mu_n \gg 1$ for all eigenvalues. Increasing all of the eignevalues of the covariance matrix by a factor $K$ is equivalent to increasing the loop gain by the same factor. If the form of the angular distribution of clutter (interference) remains the same, but the clutter power increases by $K$, the eigenvalues are increased by $K$. This poses a difficult design problem when an adaptive array is operating in an interference environment of varying and a priori unknown intensity. If the gain is selected for the maximum clutter intensity which is likely to be encountered, the system will remain stable with low loop noise; however, the transient response will be slow and a bias error will remain when the clutter intensity is smaller than the design level.

One method of reducing the variations of array performance with interference level is to hard limit the signals. Four possible limiter locations are illustrated in FIG. 2 by the legends L1 to L4. Limiters at location L1 and/or L2 affect only the adaptive loops. The process of beam formation remains linear, i.e., the output $W_T V$ is a complex weighted sum of the individual element inputs. Limiting at location L3 results in nonlinear beam formation, i.e., the incremental output due to a signal is a function of the interference input at the instant of signal arrival. Limiting at location L4 is also a form of nonlinear beam forming and counteracts amplitude tapering of the array weights, a necessary condition for low sidelobe performance. For these reasons, limiter locations L3 and L4 are ruled out. Limiting at either location L1 or L2 will reduce variations, and limiting at both locations L1 and L2 completely removes the dependence of array performance on the amplitude of the input interference field. Performance will still vary with the angular distribution of interference, however. With limiting at L1 only, the covariance matrix of the interference is changed by a constant factor. The steady state performance of an adaptive array or ADP with this type of limiting is unchanged. This has important advantages in reducing dependence of array performance on the external noise field intensity and in reducing the dynamic range of signals in the field loops. The theory of arrays with limiting at L1 has been developed by L. Brennan and I. Reed, the present inventors, and appeared in July 1971 IEEE Trans. AES.

Referring now to FIG. 2 as used in FIG. 1 in accordance with the present invention to provide an array adaptive in time as well as space for airborne MTI radar applications, it should first be understood that the transmitted waveform usually consists of a uniformly spaced train of pulses. To further explain the ADP process, consider the special case of an adaptive MTI system with a conventional antenna having a single output. In the notation of FIG. 1, $N=1$. Let $v_1, v_2, \ldots V_k$ denote the complex envelopes (a vector representing the phase and amplitude) of a train of $K$ consecutive pulse returns from one range cell. The output of an MTI canceller or doppler filter is formed by summing a consecutive set of complex-weighted pulses $$z = \sum_{n=1}^{K} w_n v_n \quad (21)$$

In a conventional 2-pulse canceller, $$w_1 = -1 \quad (22)$$

$$w_2 = = 2 \quad (23)$$

$$z = v_2 - v_1 \quad (24)$$

In a 3-pulse canceller, $$w_1 = w_3 = 1 \quad (25)$$

$$w_2 = -2 \quad (26)$$

$$z = v_3 - 2v_2 + v_1 \quad (27)$$

In high-PRF pulse doppler systems, where a large number of consecutive pulses are added coherently, the weights are generally amplitude tapered to reduce doppler sidelobe response. The design theory for these filters is directly analogous to array antenna design theory, e.g., Dolph-Chebychev weights can be used to maintain low sidelobe levels.

If the cutter spectrum is known a priori and nonvarying, an optimum filter for detecting a target of known doppler frequency can be designed using the weights of Equation (20). As in the case of antenna arrays, the steering vectors $S^*$ are matched to the signal, e.g., if the desired signal phases, determined by the target doppler frequency and PRF, are $v_{ns} = K e^{in\phi T}$, the steering vectors are $S_n^* = C e^{-in\phi T}$ where $C$ and $K$ are arbitrary complex constants, and the elements of the covariance matrix are $M_{mn} = E\{v_m^* v_n\}$, where $\{v_n\}$ is the set of random clutter voltages.

In many cases the clutter covariance is not known a priori. For example, in airborne radars the clutter spectrum is determined by the antenna pattern, scan angle, distribution of clutter echo area on the ground, and aircraft velocity. The clutter spectrum and covariance matrix vary with scan angle. An adaptive airborne MTI system according to the present invention can sense the clutter spectrum and generate optimum filter weights automatically. An adaptive filter also compensates for errors in the weights, e.g., due to delay line tolerances in an analog system. A 3-pulse adaptive array is shown in the functional block diagram of FIG. 1. Each delay line is one pulse repetition period long, such that three consecutive returns from a range resolution cell are processed together. A bank of filters could be implemented using a common set of delay lines, with a separate set of $K$ control loops for each filter. A 2-pulse, or a 5-pulse adaptive array can be similarly provided. In broadest aspects a system of $N$ elements and $K$ pulses may be provided where $N$ may be equal to or greater than one, and $K$ may be any integer greater than one.

The steering signals in the adaptive control loops are a function of the target doppler frequency and are matched to the target characteristics. For example, with a 3-pulse ADP, a conventional MTI canceller filter and uniform antenna weighting is specified by the steering signals $$S_{n1} = 1$$

$$S_{n2} = -1 \quad (28)$$

$S_{n3} = 1$ Better performance could be obtained in multipulse processors by implementing a bank of ADP circuits, one for each of several target doppler frequencies. In this case, the steering signals for optimum detection of a target with doppler frequency $f_d$ are $$S_{nk} = \exp\{-2\pi i f_d T k\}.$$

$$n = 1, 2, \ldots, N \quad (29)$$

When the problem is transformed to a system of singly subscribed variables according to Equations (9) and (10), the steady-state and transient analyses set forth hereinbefore apply directly. The proof that weights approach optimum values, the equation for optimum weights in terms of the covariance matrix, and the transient analysis in the transformed space are identical for adaptive arrays and ADP. Realization that this is so makes the ADP (the present invention) more significant. FIG. 1 is a 3-pulse exemplary embodiment.

A ten-element airborne array radar with 2-pulse and 3-pulse coherent processing has been simulated, assuming clutter present throughout a ±90° angular region. The ADP simulation results are presented in FIG. 3 as curves of MTI gain (DB) vs. number of loop iterations (samples). The MTI gain is defined as the signal-to-clutter ratio in the ADP output divided by the signal-to-clutter ratio for a single pulse (non-MTI) radar with the same array antenna. Both main beam and sidelobe clutter are included in the computations of MTI gain. A uniformly illuminated receiving array was assumed in the reference single pulse radar and a uniformly illuminated transmit array in all cases.

Figure 3:
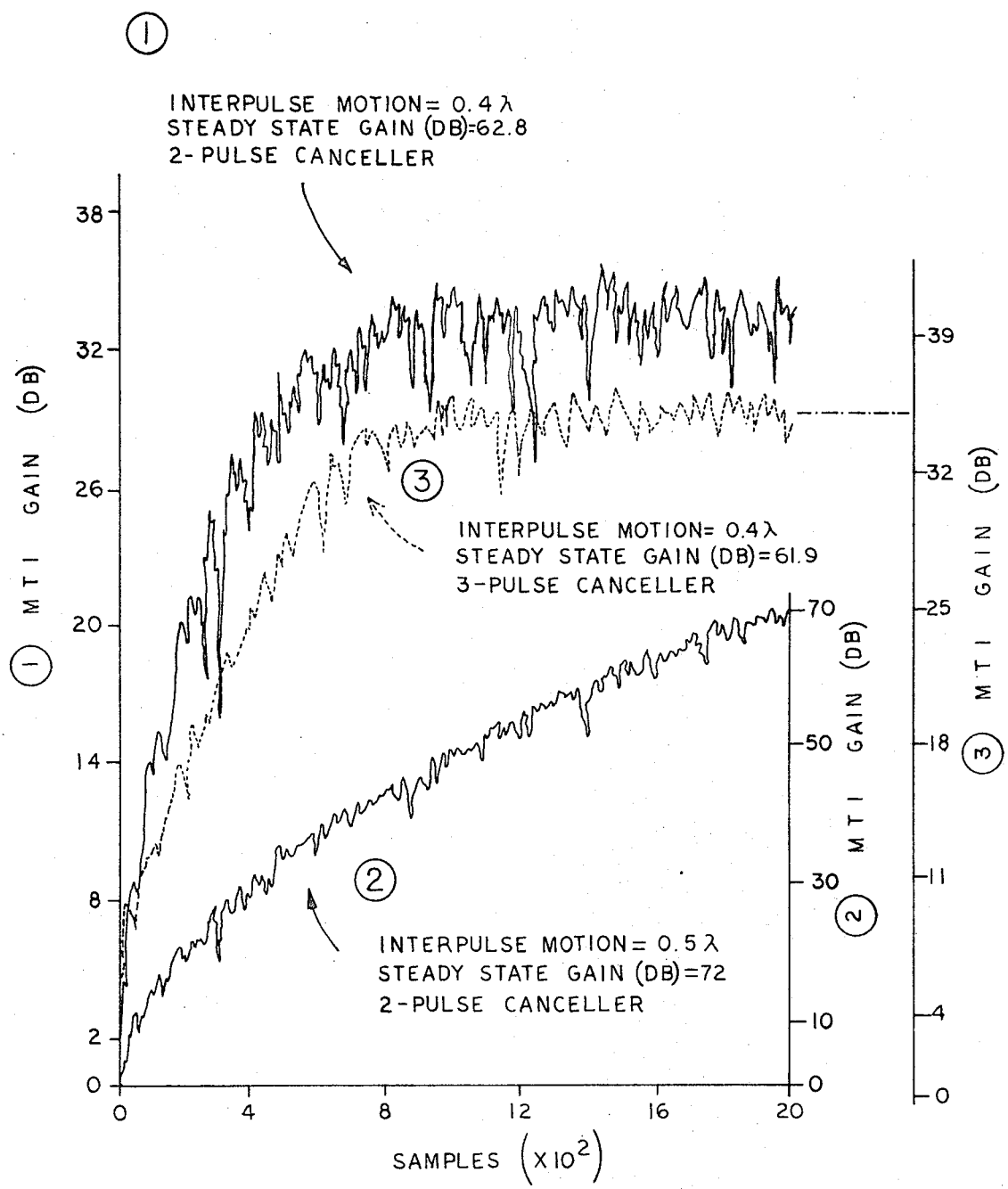
FIG. 3 is a graph of MTI gain vs. number of loop iterations for exemplary simulation runs of systems according to the present invention shown in FIG. 1.

In the graph of FIG. 3, the adaptive loop parameters are the same, namely gain (1,000), time constant (9,000,000) and steering signal amplitude (0.0010) except that for the example of a 3-pulse canceller (dotted line curve 3), the gain is only 500. For each example, ten elements are assumed with a spacing of half wavelengths. The interpulse motion of the radar and the steady-state MTI gain (corresponding to optimum weights $W_{nk}$) are shown for each curve. It should be noted that the MTI gain contains a random component in the curves. This is due to the randomness of the clutter process at the input to the set of adaptive control loops.

The transient performance of ADP is strongly dependent on the velocity of the radar platform, i.e., the interpulse motion ($V_R T/\lambda$). This dependence is illustrated in the first two curves of FIG. 3. The other parameters are the same in the two cases, while the interpulse motion increases from $0.4\lambda$ in curve 1 to 0.5 in curve 2. The antenna is looking broadside in both cases, i.e. an axis normal to the linear antenna array is perpendicular to the aircraft velocity vector. The optimum or steady-state performance is good in each case, varying from 62.8 to 72 db of MTI gain. However, the transient performance is excellent for the interpulse motion of $0.5\lambda$, i.e. when displacement of the array illumination function by two element spacings almost exactly compensates for the radar platform motion. In this case, the ADP achieves an MTI gain close to the steady-state MTI gain after 2000 loop iterations. For the interpulse motion of $0.4\lambda$, the transient response is poor and the adaptive loops are noisier as indicated by a large random component in curve 1.

The covariance matrix, eigenvalues, and transient response of ADP were computed analytically for some of the cases simulated. These transient analysis results again correspond quite closely to the simulation results. Slow loop convergence occurs in case of widely disparate eigenvalues. This appears to be an important limitation to ADP performance. One solution is to vary the radar PRF with scan angle and platform velocity to maintain the interpulse motion at an integral number of half element spacings. In other words, it has been found that varying the PRF is one way to improve convergence. Corresponding adjustments are then made in the delay elements of the pulse canceller. However, as noted hereinbefore the delay and pulse repetition period is normally selected at the time of design for a particular installation.

One set of results for a 3-pulse ADP is shown in curve 3 of FIG. 3. Comparison of the simulation results in curve 1 and 3 suggests that increasing the number of pulses, $K$, is not a solution to the problems of loop noise and convergence rate. Note that the vertical scale, MTI gain, varies from curve to curve.

From the foregoing it may be seen that an adaptive receiving array antenna for coherent pulsed airborne MTI radar is provided to yield the combination of space and time-domain adaptive processing by adaptively controlling complex weights applied to outputs from each range ring obtained for each of $K$ consecutive pulses. Space adaptive processing alone is effective in reducing clutter and other interference received through the antenna sidelobes, while space-time adaptive processing (ADP) rejects main beam and sidelobe clutter. Thus both the receiving array illumination function and the MTI filter parameters are controlled adaptively in an airborne MTI radar system, with the additional capability of varying the illumination function from pulse to pulse to compensate for radar platform motion. However, as noted hereinbefore, the convergence rate is too slow in some cases to accommodate antenna scan rates of interest. A way of improving convergence rate will now be described and reference to FIG. 4.

The coherent pulsed airborne radar employing the adaptive space-time processing technique of the present invention for which a solution to the convergence problem has been found is for a 2-pulse canceller MTI system. In the general case of such a system, a set of $K$ consecutive returns from each range ring is obtained from each of $N$ array elements. These $KN$ coherent samples (both amplitude and phase information is retained) are multiplied by adaptively controlled complex weights $W_{nk}$ and added to obtain the output $V_\Sigma$ for the corresponding range resolution cell. Here $K$ is set equal to two, and again for simplicity only a linear array of elements 1 to $N$ is considered, and only one channel for element 1 will be described.

The $K$ coherent samples for element 1 are signals $V_1$ delayed by a delay element 31 after amplification in a low noise amplifier 32. The second sample, or pulse, $V_2$ is taken directly from the amplifier 32. In a 2-pulse MTI system without a transformation matrix 33 to improve convergence rate, the samples would be applied directly to multipliers 34 and 35 for multiplication by complex weights $W_{1,1}$ nd $W_{1,2}$ provided by adoptive control loops 36 and 37. The control loops are identical, except for differences in the steering signals, as described with reference to FIG. 2.

In a 2-pulse MTI system with the Radar line-of-sight normal to the platform velocity, the complex weights are formed adaptively with the steering signals $S_{n1} = = 1$ and $S_{n2} = = -1$, where $N = 1,2 \ldots N$ corresponds to the element number. At scan angles other than normal to the platform velocity, the steering signals $S_{nk}^=$ are matched to a target moving $\lambda/4$ radially between pulses. Summing means 45 yields the output $V_\Sigma$ as before. The transformation matrix 33 does not change the organization and operation of the adaptive control loops and summing means; it merely provides for increasing the loop convergence rate to achieve a level of MTI system performance limited only by receiver noise and clutter internal motion.

Before describing the transformation matrix employed to significantly speed convergence, two topics will be discussed which provide some insight as to why the transformation matrix will improve loop convergence. The first topic relates to a transient solution in normal coordinates. Briefly, the covariance matrix of the clutter (plus noise and other interference) is always Hermitian, i.e., $$M_{mn} = E \{v_m^* V_n\} = M_{mn}^* \qquad (30)$$

Therefore, there exists a unitary transformation which transforms the problem to normal coordinates, i.e., to a set of independent differential equations. Singly subscripted variables, as defined in Equations (9) and (10) will be considered in this discussion. Let $x_1, x_2, \ldots, x_{KN}$ denote the element/pulse outputs in normal coordinates, with the covariance matrix $$\mu_{mn} = E\{x_m^* x_n\} = \mu_n \quad m=n \quad (31)$$
$$= 0 \quad m \neq n$$

This covariance matrix contains only diagonal elements, with values equal to the eigenvalues of the original covariance matrix $M$. exponential Exponential time constant which determines the transient response of the $n^{th}$ component $x_n$ is $$\tau_n = \tau/(G\lambda_n + 1) \quad (32)$$

where
 $\tau_n$ = time constant of $n^{th}$ component in normal coordinates
 $\tau$ = time constant of integrator in control loops
 $G$ = gain of amplifier in control loops The loop convergence rate can be increased by increasing $G$ or decreasing $G/\tau$. However, for large $G/\tau$ ratios, the loops become noisy and eventually become unstable. It is shown in the aforementioned publication of IEEE Trans. AES at pages 254 to 262 that the total noise in the array output is increased by the following factor due to control loop noise:

$$C = 1 + \frac{G}{2\tau} \sum_{n=1}^{KN} \lambda_n \quad (33)$$

where $\tau$ is measured in sample intervals. When the eigenvalues have widely disparate values, no set of the loop parameters $G$ and $\tau$ provides both rapid convergence and low loop noise.

Suppose that a system were implemented in normal coordinates, i.e., the array/pulse outputs transformed by the unitary transformation to a set of independent inputs $x_n$. Then a set of amplifiers could be used in the individual channels with different gains. Let the $n$th amplifier gain be $g_n$ and the corresponding amplifier output be $y_n$.

$$y_n = g_n x_n \quad (34)$$

If each $g_n$ is set equal to $1/\sqrt{\lambda_n}$, where $\lambda_n$ is the corresponding eigenvalue, the $y$ covariance matrix becomes $$\nu_{mn} = E\{y_m^* y_n\} = 1 \quad m=n$$
$$= 0 \quad m \neq n \quad (35)$$
$$\nu = I$$

where $I$ is the identity matrix. Good solutions are clearly possible in $y$ space, where the loop noise factor is $C = 1 + GKN/2\tau$. Setting $GKN/2\tau = 0.1$, for example, would not introduce a significant amount of control loop noise in the array output. Each normal component time constant would then be $$\tau_n \doteq 5KN$$

For example, with a 2-pulse 20-element system, $KN = 40$ and each $\tau_n$ is 200. Excellent convergence would be obtained in 1000 sample intervals.

The problem with this approach is that the covariance matrix $M$ is not generally known a priori. This covariance matrix must be known to compute the necessary unitary Transformation from $v$-space to $x$-space and to select a good set of $g_n$. Also, the transformation would, in general, be complex to implement. This method of speeding convergence could be used when the complexity is admissable and the covariance matrix is shown approximately a priori.

Figure 7:
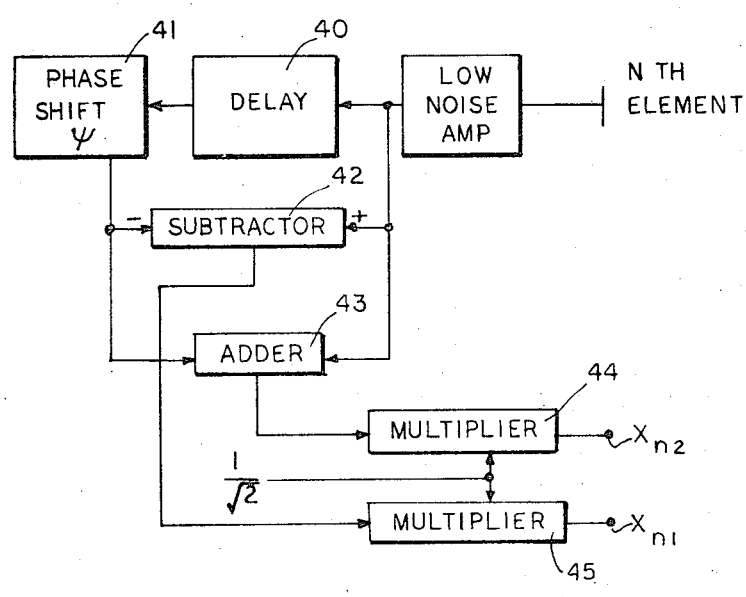
FIG. 7 is a block diagram of a transformation matrix for the system of FIG. 4.

The second related topic which provides insight into the transformation matrix of FIG. 7 is the following. Consider a 2-pulse MTI system, i.e., $N = 1$, $K = 2$. This type of system could be implemented adaptively, e.g., to provide automatic clutter tracking in a conventional airborne MTI radar. Again, let $v_1$ and $v_2$ denote the two coherent samples from one range ring. Let $M$ be the covariance matrix of the $v$ process of Equation (30) and let $M$ have the form $$M = \sigma^2 \begin{pmatrix} 1 & \rho \\ \rho & 1 \end{pmatrix} \quad (36)$$

where $\rho$ is real.

The unitary transformation from $v$-space to $x$-space, where $x_1$ and $x_2$ are independent variables, is $$\begin{pmatrix} x_1 \\ x_2 \end{pmatrix} = \frac{1}{\sqrt{2}} \begin{pmatrix} 1 & -1 \\ 1 & 1 \end{pmatrix} \begin{pmatrix} v_1 \\ v_2 \end{pmatrix} \quad (37)$$

or $$x_1 = \frac{v_1 - v_2}{\sqrt{2}} \quad (38)$$

$$x_2 = \frac{v_1 + v_2}{\sqrt{2}} \quad (39)$$

The covariance matrix in $x$-space is $$\mu = \sigma^2 \begin{pmatrix} 1-\rho & 0 \\ 0 & 1+\rho \end{pmatrix} \quad (40)$$

In a 2-pulse MTI system, the correlation coefficient would often be known approximately. The sum and differences, $x_2$ and $x_1$, could be obtained easily and amplified by gains which depend on the a priori estimate of $\rho$.

$$g_1 = g_2 \sqrt{(1+\rho)/(1-\rho)} \quad (41)$$

The resulting $y$ variables are $$y_1 = g_1 x_1 \quad (42)$$

$$y_2 = g_2 x_2 \quad (43)$$

and the $y$ covariance matrix is proportional to $I$, i.e., $$\nu = \begin{pmatrix} \langle y_1^* y_1 \rangle & \langle y_1^* y_1 \rangle \\ \langle y_2 y_1 \rangle & \langle y_2 y_2 \rangle \end{pmatrix} = g_2^2 (1+\rho) I \quad (44)$$

This 2-pulse MTI example suggests one case where the procedure outlined with reference to Equations (30) to (31) could be implemented adaptively with parameters selected on the basis of approximate a priori Information.

Figure 4:
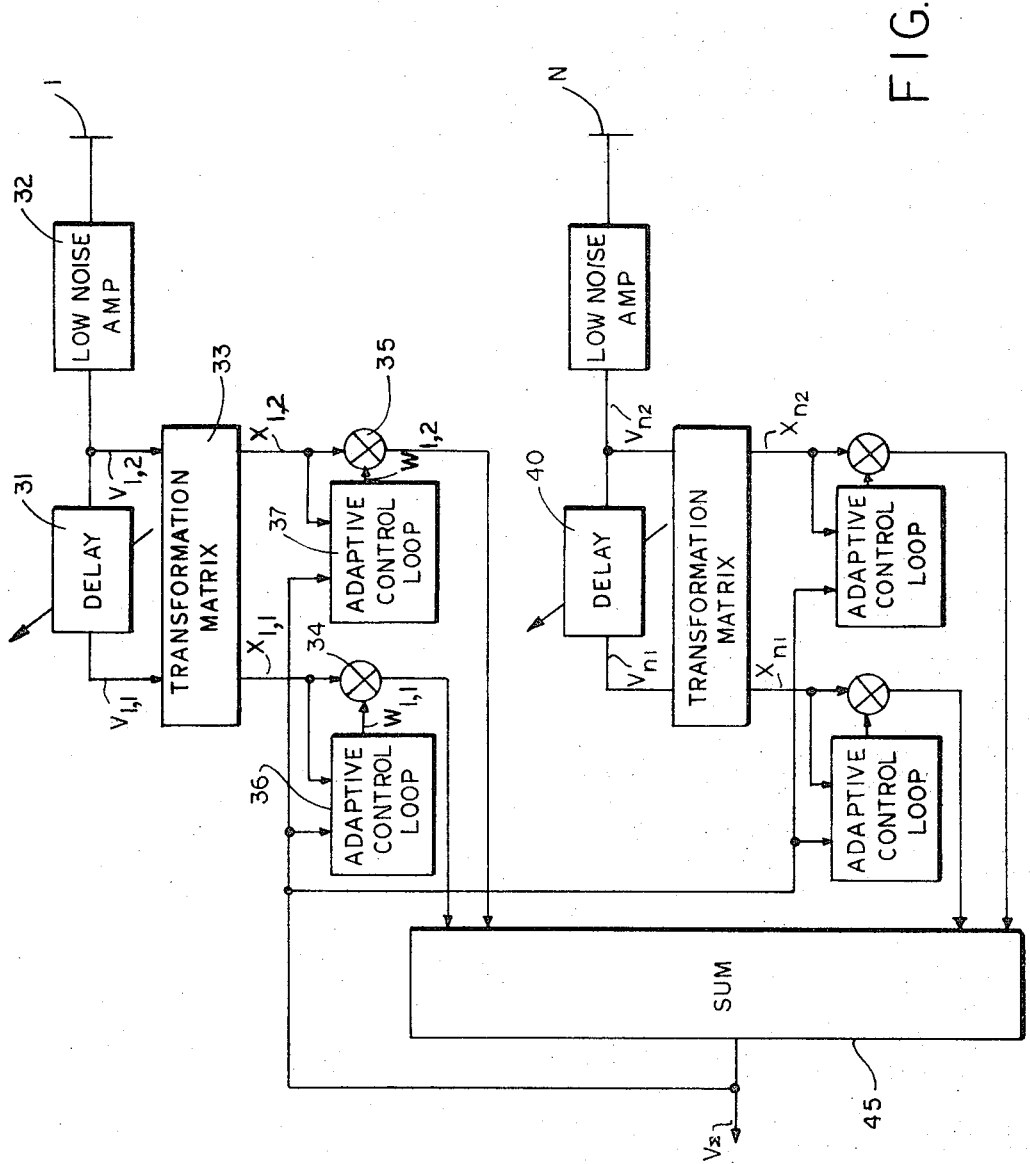
FIG. 4 is a block diagram of an adaptive doppler signal processing system with a transformation matrix to improve the convergence rate of a 2-pulse MTI system.

The method of improving loop convergence illustrated in FIG. 4 which has been found to work well in many cases of adaptive doppler processing is the following.

Two consecutive pulses from a range cell are processed adaptively (i.e., $K=2$). The outputs $V_{nk}$ from the $k^{th}$ pulse and $n^{th}$ array element are transformed to a new set of $KN$ variables $K_{nk}$ $$X_{n1} = (V_{n2} - V_{n1}e^{+i\psi}) / \sqrt{2} \quad (45)$$

$$X_{n2} = (V_{n2} + V_{n1}e^{+i\psi}) / \sqrt{2} \quad (46)$$

The phase rotation $\psi = (4\pi D/\lambda) \cos\theta$, where D is the distance the platform moves between pulses, $\lambda$ is wavelength, and $\theta$ is main beam scan angle from the radar velocity vector. This is the phase shift $\psi$ of a fixed clutter scatterer at angle $\theta$ from the platform velocity vector, and results in a set of $X_{n1}$ which contains a small clutter contribution. The $X_{n2}$ are simply the other variables obtained in the transformation and must be retained to provide the array with the necessary $KN$ variables. For scan angles normal to the ground track, $\psi = 0$, and $X_{n1}$ is simply $(V_{n2} - V_{n1}) / \sqrt{2}$.

Larger gain is then introduced in the $X_{nl}$ channels than in the $X_{n2}$ channels before the adaptive loops. The ratio of these two gains which yields good adaptive array performance has been determined by trial and error for a variety of cases.

The Equations (45) and (46) which define the transformation matrices of FIG. 4 can also be expressed in matrix notation according to Equations (6), (7) and (8).

In the simulation examples of the transformation from $V$ to $X$ signals to be described with reference to FIGS. 5 and 6, the gain before the $X_{n2}$ adaptive loops is unity, such as the loop 37, and is a value GFAC in the $X_{nl}$ loops, where GFAC is equal to 1 or 5. With GFAC equal to 1, the solutions with and without the transformation matrix are identical, provided the same values are used for other system parameters, thus demonstrating that the ratio of gain in the $X_{nl}$ loop to the gain of the $X_{n2}$ loop must be greater than unity to improve convergence.

Figure 5:
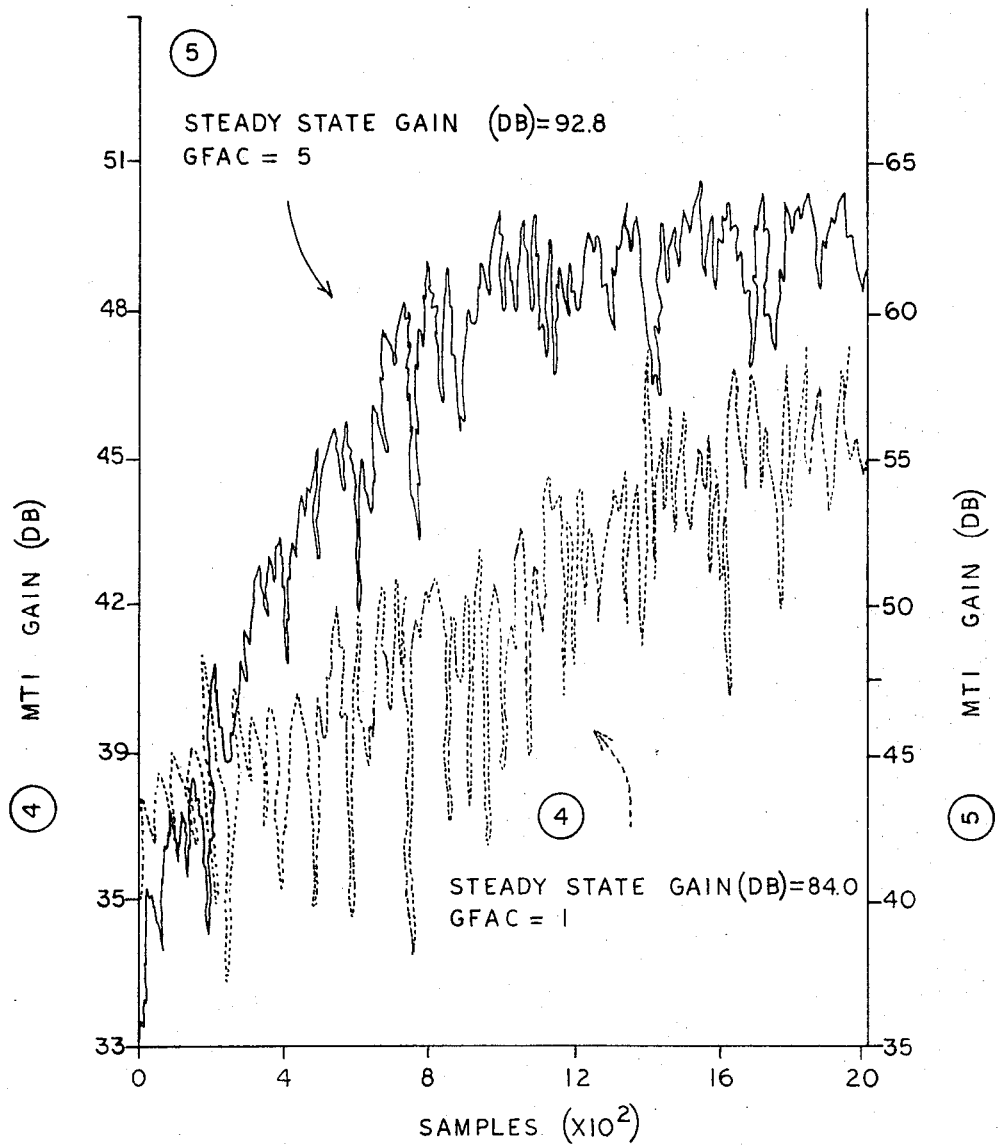
FIGS. 5 and 6 are graphs of MTI gain vs. number of loop iterations for exemplary simulation runs of systems according to the present invention shown in FIG. 4.

An example of the improvement in convergence rate which can be achieved with this transformation matrix is indicated by curves 4 and 5 in FIG. 5. In curve 4, the same gain is used in the sum ($X_{2n}$) and difference ($X_{n1}$) channels whereas in curve 5, the gain (GFAC) in the difference ($X_{n1}$) channels is five times greater than in the sum ($X_{n2}$) channels. The steady-state gain in both cases is very good. The loops are converging toward a solution which provides 84 db of MTI gain. This is at least 20 db more MTI gain than is required in a typical system and performance would be receiver-noise limited before reaching this limit. However, with GFAC equal to 1, the convergence of the adaptive system is slow, just as without the transformation matrix. Only 46 db of MTI gain is obtained after 2000 range cells of data are processed. Note also that the loops are somewhat noisy in the example of curve 4. The loop $G/\tau$ ratio could not be increased to improve convergence. The same system was simulated with GFAC equal to 5. As shown in curve 5, the transient performance was improved very substantially with no noticeable increase in control loop noise. The transient response after 2000 samples of loop input improved by about 16 db. This improvement from 46 to 62 db of MTI gain is very important; while 46 db is usually not adequate MTI gain for a typical airborne system, 62 db of MTI gain is generally sufficient. This example is for a scan angle of 0°, i.e. for the main beam pointed along the radar ground track.

Figure 6:
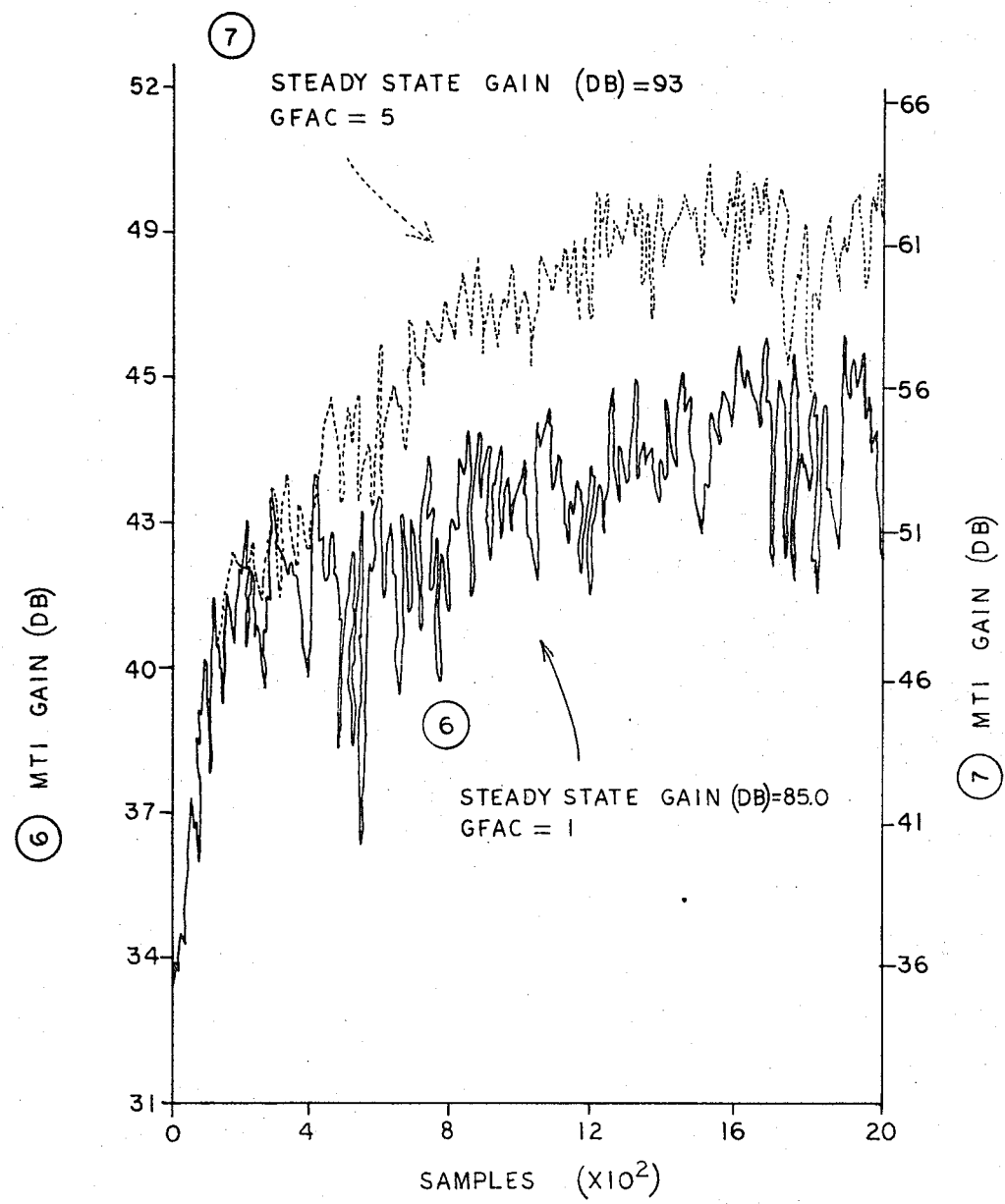

A second set of examples is shown in FIG. 6. The scan angle in this case is 45°. The MTI gain after 2000 range cells of data is increased from 44 db to 63 db when GFAC is increased from 1 in curve 6 to 5 in curve 7. As before, the theoretical steady-state gains exceed 80 db in both cases. In another simulation (not shown), the GFAC value was set equal to 10. The results showed unstable convergence at a slower rate than with GFAC equal to 5. There is clearly a limit to the ratio of gains which is useful in this example. Performance degrades as GFAC is further increased above about 5.

The variable gains in different $X_{nk}$ signals can be implemented in either of two ways. First, the $X_{n1}$ signals can be amplified relative to the $X_{n2}$ signals by a factor GFAC prior to an adaptive array in which each control loop amplifier has a gain $G$. Exactly the same result is obtained by increasing the amplifier gain $G$ by the factor (GFAC)$^2$ in the $X_{n1}$ channels, with unity gain in both the $X_{n1}$ and $X_{n2}$ channels before the adaptive arrays. This latter equivalence is the one assumed in the embodiment illustrated in FIG. 4.

In simulating a variety of different cases it was found that this transformation matrix provides the best convergence rate when the clutter residue in the $X_{n1}$ channels is small. For example, for a given interpulse platform motion, better performance is obtained for scan angles along the ground track that for scan angles nearly perpendicular to the ground track. This would be expected since for $\theta \doteq 0°$ the main beam clutter spectrum is narrower and the $X_{n1}$ components contain a smaller clutter residue. Better performance would also be expected with larger arrays and/or lower transmit antenna sidelobes since these changes would yield lower clutter residue in he difference channels. Uniformly illuminated transmit arrays, with high first sidelobes, were assumed in all of the simulations.

The transformation matrix 33 of FIG. 4 defined by Equations (45) and (46) may be implemented in either digital form, as by programming a special purpose radar computer, or in analog form, depending upon the form of the Signals being received from radar elements. A hybrid form is still another possibility. FIG. 7 illustrates a transformation matrix in analog form. A delay element 40 for the $N^{th}$ element stores the signal $V_{n1}$ so that it will be available with the signal $V_{n2}$. The signal $V_{n1}$ is phase shifted by the angle $\psi$ in a phase shifter 41. The difference $(V_{n2} - V_{n1} e^{i\psi})$ is formed in a subtractor 42, such as a differential amplifier and the sum $(V_{n2} + V_{n1} e^{i\psi})$ is formed on an adder 43, such as a summary amplifier. The sum and difference signals are then each multiplied by $1/\sqrt{2}$ in multipliers 44 and 45. Since the multiplication factor is fixed, and an operational amplifier can be used for multiplication, the multiplication factor can be set by simply selecting the ratio of the feedback resistor to the input resistor. It should be noted that if the larger gain in the $X_{n1}$ channel is to be introduced before the adaptive loops, it can be readily done in the multipliers by taking it into consideration in selecting the ratio of the feedback resistor to the input resistor for each operational amplifier.

A hybrid system in which analog-to-digital conversion takes place just before sum and difference amplifiers (or just before the multipliers) is possible, as noted hereinbefore, but unless the adaptive control loops are to be implemented in digital form, it would be of little advantage to implement any part of the transformation matrix in digital form. Digital implementation would seen to be of advantage only when the data is available in digital form from the array elements, i.e., when the array elements include apparatus for synchronously converting analog return signals to digital form as is often the practice in modern radar systems.

Although the present invention has been described with reference to particular embodiments and variations it is to be understood that additional embodiments and variations will be obvious to those skilled in the art. Consequently, it is intended that the claims be interpreted to cover such embodiments and variations.

What is claimed is:

1. A method for adaptive processing of signal return to an antenna comprised of receiving $NK$ samples of signal return and retaining both amplitude and phase information in each sample, where $N$ is a number of receiving elements numbered in sequence from one to any integer greater than one, and $K$ is a number from two to any integer greater than two of consecutive returns from successive range rings, and multiplying each of said $NK$ samples from the same range ring by adaptively controlled complex weights $W_{nk}$ and adding the products to obtain an output according to the equation $$V_\Sigma = \sum_{n=1}^{N} \sum_{k=1}^{K} W_{nk} V_{nk}$$

where $W_{nk}$ is the complex weight applied to the $n^{th}$ element for the $k^{th}$ return, and $V_{nk}$ is the voltage of the $k^{th}$ return from the $n^{th}$ element, and where the complex weight for a given return of the $n^{th}$ element is produced by converting the element voltage signal $v_n$ for said given return into its complex conjugate $v_n^*$, multiplying said complex conjugate $v_n^*$ by said output $V_\Sigma$ to obtain a signal $z_n$, and low-pass filtering said signal $z_n$, subtracting from a steering signal $s_n^*$ is the low pass filtered signal, where the steering signal is matched to the desired signal return.

2. A method as defined in claim 1 wherein $N$ is selected to be equal to one, thereby providing adaptive processing in the time domain only.

3. A method as defined in claim 1 wherein $N$ is selected to be greater than one, thereby providing adaptive processing in time and space domains.

4. A method as defined in claim 1 wherein the signal amplitude of said complex conjugate $V_v^*$ is hard limited to a constant predetermined value.

5. A method as defined in claim 4 wherein $N$ is selected to be equal to one, thereby providing adaptive processing in a time domain only.

6. A method as defined in claim 5 wherein $N$ is selected to be greater than one, thereby providing adaptive processing in both time and space domains.

7. A method as defined in claim 1 wherein the convergence rate of the adaptive control of the system is improved, in a system in which $K$ is selected to be equal to two, by transforming successive output signals $V_{n1}$ and $V_{n2}$ from a given element $n$ into $X_{n1}$ and $X_{n2}$ according to the following equations $$X_{n1} = (1/\sqrt{2})(V_{n2} - V_{n1}{}^{i\psi})$$

$$X_{n2} = (1/\sqrt{2})(V_{n2} + V_{n1}{}^{i\psi})$$

before forming the sum $V_\Sigma$ using the transformed signals $X_{n1}$ and $X_{n2}$ in place of the element output signals $V_{n1}$ and $V_{n2}$.

8. A method as defined in claim 7 wherein $N$ is selected to be equal to one, thereby providing adaptive processing in the time domain only with an improved convergence rate.

9. A method as defined in claim 7 wherein $N$ is selected to be greater than one, thereby providing adaptive processing in time and space domains with an improved convergence rate.

10. A method as defined in claim 1 wherein the repetition frequency between signal returns is varied by changing the pulse repetition frequency of a transmitter, and the time delay between returns is adjusted accordingly to maintain successive returns available for simultaneous processing, thereby improving the convergence rate of the adaptive processing method.

11. A method as defined in claim 7 wherein the repetition frequency between signal returns is varied by changing the pulse repetition frequency of a transmitter, and the time delay between returns is adjusted accordingly to maintain successive returns available for simultaneous processing, thereby improving the convergence rate of the adaptive processing method.

12. A method as defined in claim 7 wherein the phase shift angle $\psi$ is selected to be equal to $(4\pi D/\lambda) \cos \theta$, where D is the distance said antenna moves between transmission pulses from which return signals result, $\lambda$ is signal wavelength, and $\theta$ is the approximate angle of the antenna main beam axis to the velocity vector of antenna motion, whereby transformation of $V_{n1}$ and $V_{n2}$ signals to corresponding $X_{n1}$ and $X_{n2}$ signals is to approximately normal coordinates, and wherein a larger gain factor is provided in the $X_{n1}$ channels than in the $X_{n2}$ adaptive processing channels.

13. A method as defined in claim 12 wherein said larger gain actor is selected to be approximately equal to five.

14. A method as defined in claim 12 wherein the larger gain factor is provided by introducing a greater gain factor in the transformation matrix for the signal $X_{n1}$ than for the signal $X_{n2}$.

15. A method as defined in claim 12 wherein the larger gain factor is provided by introducing a gain in generating a complex weight for the $X_{n1}$ channel greater than a gain in generating a complex weight for the $X_{n2}$ channel.

16. Apparatus for adaptive processing of signal return to an antenna comprised of means for receiving $NK$ samples of signal return, and retaining both amplitude and phase information in each samples, where $N$ is a number of receiving elements numbered consecutively from one to any integer greater than one, and $K$ is a number from two to any integer of consecutive returns from successive range rings, means for multiplying each of said $NK$ samples by said adaptively controlled weights $W_{nk}$, adaptive control means for producing and adaptively controlling weights $W_{nk}$ for each signal return $V_{nk}$, where for a given signal $v_n$ the weight $v_n$ of said adaptive control means is produced by means for converting the signal $v_n$ into its complex conjugate $v_n^*$, means for multiplying said complex conjugate $v_n^*$ by said output $V_\Sigma$ to obtain a signal $z_n$, means for low-pass filtering said signal $z_n$, and means for subtracting from a steering signal $s_n^*$ the low-pass filtered signal, where the steering signal is matched to the desired signal return in both angle and time, and summing means for adding the products produced by said multiplying means to obtain an output according to the equation $$V = \sum_{n=1}^{N} \sum_{n=1}^{K} W_{nk} V_{nk}$$

17. Apparatus as defined in claim 16 wherein $K$ is selected to be equal to two, including means for improving the convergence rate of the adaptive control means by transforming successive output signals $V_{n1}$ and $V_{n2}$ from each of said elements into corresponding $X_{n1}$ and $X_{n2}$ signals according to the following equations $$X_{n1} = (1/\sqrt{2})(V_{n2} - V_{n1}{}^i\psi)$$

$$X_{n1} = (1/\sqrt{2})(V_{n2} + V_{n1}{}^i\psi)$$

before forming the sum $V_\Sigma$ in said summing means using the transformed signals $X_{n1}$ and $X_{n2}$ in place of signals $V_{n1}$ and $V_{n2}$, respectively.

18. Apparatus as defined in claim 17 wherein the phase shift angle $\psi$ is selected to be equal to $(4\pi D/\lambda) \cos \theta$, where D is the distance said antenna moves between transmission pulses from which return signals result, $\lambda$ is signal wavelength, and $\theta$ is the approximate angle of the antenna main beam axis to the velocity vector of antenna motion, whereby transformation of $V_{n1}$ and $V_{n2}$ signals to corresponding $X_{n1}$ and $X_{n2}$ signals is to approximately normal coordinates, and wherein a larger gain factor is provided in the $X_{n1}$ channels than in the $X_{n2}$ adaptive processing channels.

* * * * *